United States Patent [19]

Carboniero

[11] Patent Number: 4,567,800

[45] Date of Patent: Feb. 4, 1986

[54] DRIVE WITH SINGLE HYDRAULIC CYLINDER FOR UNIVERSAL TYPE PUNCHING SHEARS

[75] Inventor: Flavio Carboniero, Schio, Italy

[73] Assignee: Omera S.p.A., Vicenza, Italy

[21] Appl. No.: 569,917

[22] Filed: Jan. 11, 1984

[30] Foreign Application Priority Data

Jan. 20, 1983 [IT] Italy ............................... 85509 A/83

[51] Int. Cl.⁴ ............................................. B23D 31/00
[52] U.S. Cl. ......................................... 83/399; 83/518; 83/523; 83/549; 83/618
[58] Field of Search ................................ 83/549–555, 83/571, 514, 515, 518, 598, 599, 601, 618, 639, 58, 523, 399; 72/442

[56] References Cited

U.S. PATENT DOCUMENTS

| | | | |
|---|---|---|---|
| 235,908 | 12/1880 | Sellers | 83/571 |
| 1,006,761 | 10/1911 | Kraut | 83/518 X |
| 3,140,634 | 7/1964 | McDaniel, Jr. | 83/599 X |
| 3,701,276 | 10/1972 | Malmgren | 83/518 X |
| 4,067,252 | 1/1978 | Peddinghaus | 83/639 X |

Primary Examiner—James M. Meister
Attorney, Agent, or Firm—Birch, Stewart, Kolasch & Birch

[57] ABSTRACT

A punching and shearing machine in which a single hydraulic cylinder (1) operates alternatively the punch or the shear of the machine. When the punch is operative, a manually operated eccentric lever (16) blocks the shear carrying member (8) so that the stem (6) of the piston in the hydraulic cylinder (1) causes motion of the punch carrying member (3). If, on the other hand, the shear is to be operated, another manually operated eccentric lever (14) blocks the punch carrying member (3), so that the external part of the hydraulic cylinder, which is connected to the shear carrying member (8), causes the motion of the shear carrying member only. Safety micro-switches are provided to interrupt the hydraulic circuit controlling the cylinder (1), if the eccentrics (14, 16) are both free or both are blocking a tool carrying member.

5 Claims, 4 Drawing Figures

DRIVE WITH SINGLE HYDRAULIC CYLINDER FOR UNIVERSAL TYPE PUNCHING SHEARS

BACKGROUND OF THE INVENTION

1. Field Of The Invention

Multi-purpose shears are machines which are generally used in the plate-manufacturing field and which are capable of performing several operations, such as punching, slotting, sheet-cutting and shearing of structural shapes.

2. Description Of The Prior Art

The known machines of this type consist mostly of a structure which contains two oscillating parts: the first one in the front of the machine controls, through special mechanisms, the punching part; the second one in the back operates the swinging part to which the slotting, the cutting or the shearing operations are connected. The operation of the machine can be of the mechanical type with clutch coupling or of the hydraulic type. The known machines in this field having the hydraulic type drive for the operation of the machine include the use of two different hydraulic cylinders which operate the part connected with the punching operation and the part connected with the other above-mentioned operations respectively.

SUMMARY OF THE INVENTION

The present invention utilizes a single hydraulic drive which includes a single control cylinder to operate both the punching part and the cutting part of the machine. This is done by connecting the stem of the hydraulic cylinder piston with the pivoted punch carrying member, and the cylinder itself, or better, its external part, with the shear carrying member. According to the need of operating one tool carrying member rather than the other one, the inactive tool carrying member will be rendered stationary, so that the action of the cylinder develops only on one side and, therefore, only causes the motion of the tool carying member to be activated.

Through this, a considerable saving in the construction of the machine is obtained, because, besides having reduced the number of the cylinders from two to one, all the elements which are connected to the cylinder, such as the electric valve which opens and closes the hydraulic circuit connected to each cylinder, the tubes and the hydraulic distributors, are reduced as a consequence. As a consequence the maintenance of the machine will also be reduced as far as time and money are concerned.

BRIEF DESCRIPTION OF THE DRAWINGS

These and other advantages and operational characteristics will be better emphasized by the description of a preferred form of construction of the control with a single hydraulic cylinder, which is given only by way of example but is not meant to be limiting, and which is illustrated in the enclosed drawings, wherein.

Figure 1:
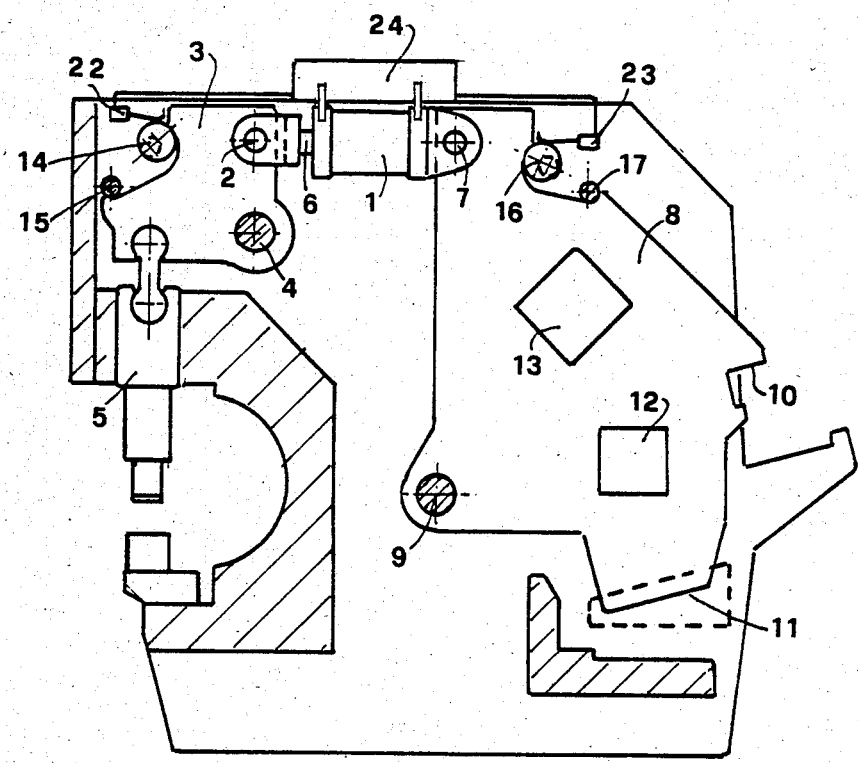
FIG. 1 represents a longitudinal cross-section of the machine equipped with a single hydraulic control.
Figure 2:
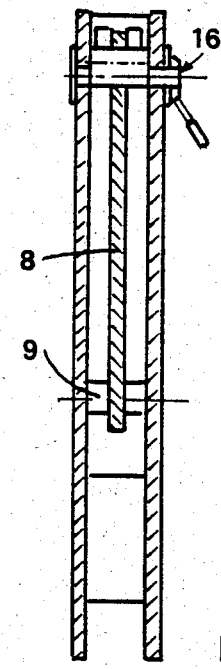
FIG. 2 is a transveral cross-section of the same and shows one of the eccentric blocks of the machine.

With reference to to FIG. 1, the hydraulic cylinder 1 has piston 6 connected by means of a bolt to punch carrying member 3, which is pivoted to a base member at pin 4 and which controls the motion of slide 5 supporting the punch.

Figure 3:
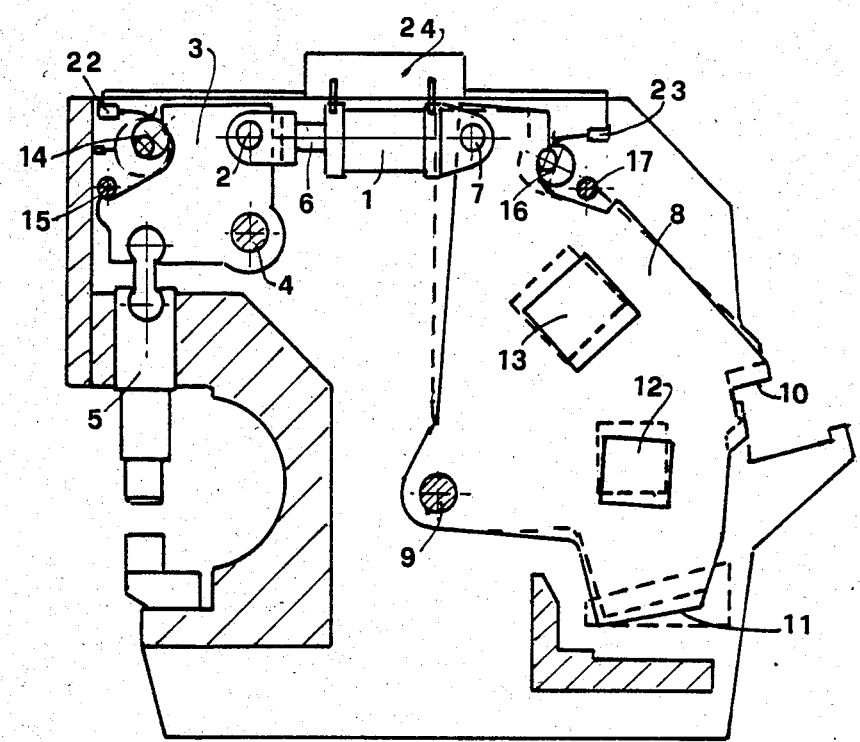
FIG. 3 shows the hydraulic cylinder while it operates the rear part, i.e. the shear carrying member to the cutting unit.
Figure 4:
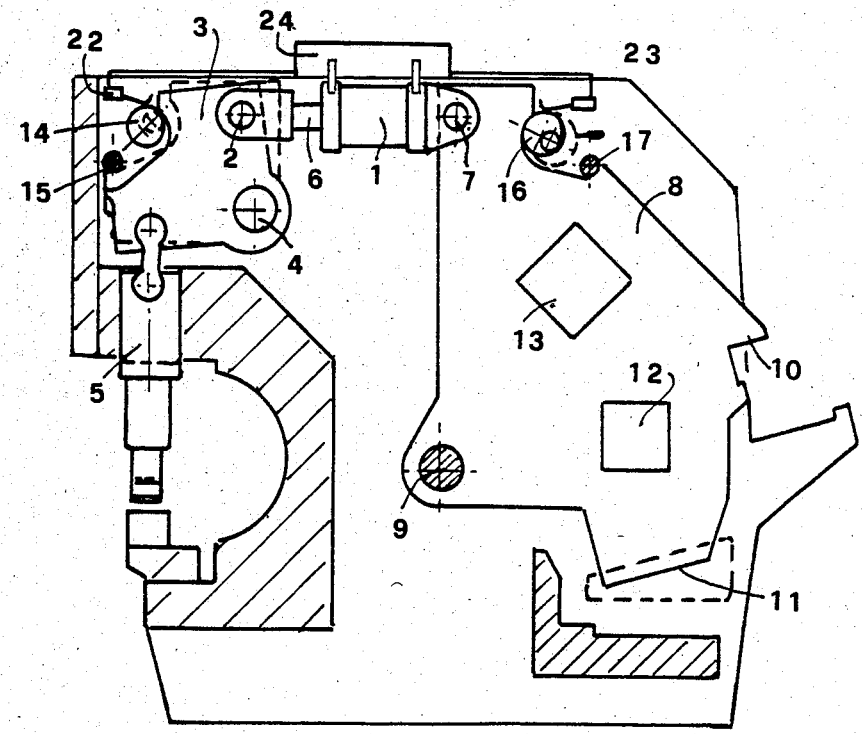
FIG. 4 shows the hydraulic cylinder operating the front part of the machine, i.e. the punch carrying member.

On the other hand, the head of hydraulic cylinder 1 is connected by means of bolt 7 to shear carrying member 8. Shear carrying member 8 is pivoted at pin 9 and constitutes the support of the blade-holder of the slotter in 10, of the shears for sheet-plates in 11 and of the two shears for structural shapes in 12 and 13. With reference to the machine operating as shears (see FIG. 3), first of all, one must manually rotate the eccentric 14 so that the punch carrying member 3 cannot move. In fact this tool carrying member is blocked not only by eccentric 14 in one sense of rotation, but also by stop-pin 15, which fulfills the role of a fixed stop for the punch carrying member. After this type of blocking has been carried out, cylinder 1 is set in operation and it will set in motion shear carrying member 8, which causes the machine to perform a pre-selected cutting operation. On the other hand, FIG. 4 shows the operation of the punch carrying member and the ensuing blockage of the shearing part of the machine. In this case it is eccentric 16 which will be rotated against the shear carrying member 8, while pin 17 will act as a fixed stop upon the retraction of shear carrying member 8. When the machine has been prepared in this fashion, the hydraulic cylinder will be stiffly blocked, so that, when it is operated, stem 6 will set punch carrying member 3 in motion and that in turn will operate the punching part.

It is important to point out more clearly the function of the two stop-pins 15 and 17. They provide that the tool carrying member always return to the same position and, therefore, guarantee the same position of the various punching or cutting tools when the machine is at a standstill. In addition, two micro-switches 22, 23 are located on the machine and adapted to contact the eccentrics 14 and 16. These micro-switches will interrupt the operation of the hydraulic unit 24, should both eccentrics be free of the tool carrying members or both eccentrics be engaging the tool carrying members. This is done for obvious safety and functional reasons.

I claim:

1. A punching and shearing machine comprising a base member, a punch carrying member pivoted to said base member, a shear carrying member pivoted to said base member, a first manually operated eccentric means mounted on said base for selectively rendering said punch carrying member stationary, a second manually operated eccentric means mounted on said base for selectively rendering said shear carrying member stationary, hydraulic power means connected between said punch carrying member and said shear carrying member for alternatively actuating said punch carrying member or said shear carrying member, said shear carrying member being rendered stationary when said punch carrying member is actuated and said punch carrying member being rendered stationary when said shear carrying member is actuated.

2. A punching and shearing machine in accordance with claim 1, in which said hydraulic power means is a single piston and cylinder.

3. A punching and shearing machine in accordance with claim 1, in which pins are fixed to said base to provide stop means so that said punch carrying member and said shear carrying member are returned to the same position when not actuated.

4. A punching and shearing machine in accordance with claim 1, wherein interrupting means in provided to interrupt the operation of said hydraulic power means when said first and second eccentric means are both operative or both inoperative to render said punch carrying member and said shear carrying member stationary.

5. A punching and shearing machine in accordance with claim 4, wherein said interrupting means includes a first micro-switch located in contact with said first manually operated eccentric and a second micro-switch located in contact with said second manually operated eccentric.

* * * * *